United States Patent
Ibsen et al.

(10) Patent No.: US 6,862,092 B1
(45) Date of Patent: Mar. 1, 2005

(54) SPECTROMETER

(75) Inventors: Per Eld Ibsen, Valby (DK); Bjarke Rose, Allerad (DK); Michael Rasmussen, Broenshoej (DK)

(73) Assignee: Ibsen Photonics A/S, Farum (DK)

( * ) Notice: Subject to any disclaimer, the term of this patent is extended or adjusted under 35 U.S.C. 154(b) by 0 days.

(21) Appl. No.: 09/889,010

(22) PCT Filed: Jan. 7, 2000

(86) PCT No.: PCT/DK00/00006

§ 371 (c)(1),
(2), (4) Date: Mar. 28, 2002

(87) PCT Pub. No.: WO00/40935

PCT Pub. Date: Jul. 13, 2000

(30) Foreign Application Priority Data

Jan. 8, 1999 (DK) ........................................ 1999 00020

(51) Int. Cl.[7] .................................................. G01J 3/28
(52) U.S. Cl. ..................................................... 356/328
(58) Field of Search ............................... 358/4.01, 300, 358/326, 328, 445, 614; 398/15, 31, 37, 43, 75, 88; 250/237 G; 385/37, 31, 15, 75, 88

(56) References Cited

U.S. PATENT DOCUMENTS

| | | | |
|---|---|---|---|
| 3,973,850 A | | 8/1976 | Pouey |
| 4,332,706 A | * | 6/1982 | Uehara et al. ............... 523/450 |
| 4,585,349 A | | 4/1986 | Gross et al. |
| 4,675,860 A | * | 6/1987 | Laude et al. ................... 398/88 |
| 4,707,138 A | | 11/1987 | Coatney |
| 4,744,618 A | * | 5/1988 | Mahlein ....................... 385/37 |
| 4,770,530 A | | 9/1988 | Van Aken et al. |
| 4,784,935 A | * | 11/1988 | Ehrfeld et al. ............... 430/321 |
| 4,825,091 A | | 4/1989 | Breyer et al. |
| 4,838,645 A | * | 6/1989 | Machler et al. .............. 359/571 |
| 4,895,445 A | | 1/1990 | Granger |
| 5,026,160 A | | 6/1991 | Dorain et al. |
| 5,159,404 A | | 10/1992 | Bittner |
| 5,493,393 A | | 2/1996 | Beranek et al. |

(List continued on next page.)

FOREIGN PATENT DOCUMENTS

| | | |
|---|---|---|
| EP | 0 489 286 A2 | 6/1992 |
| EP | 0 942 266 A1 | 9/1999 |

(List continued on next page.)

OTHER PUBLICATIONS

International Search Report for PCT/DK00/00006.
Eugene Hecht, *OPTICS*, Second Edition, Published by Addison–Wesley Publishing Company, Inc., (1987), Section 6.3 "Aberrations", pp. 220–241.

*Primary Examiner*—Zandra V. Smith
*Assistant Examiner*—Gordon J. Stock, Jr.
(74) *Attorney, Agent, or Firm*—Altera Law Group, LLC

(57) ABSTRACT

A method and apparatus for measuring spectral information of light from at least one object includes at least one light detector and at least one transparent body. The transparent body has a front side that has an entrance aperture and at least one reflecting surface. The transparent body also has a back side that includes at least one reflecting surface and an exit surface. The detector is positioned near the exit surface. At least one of the front reflecting surface and the back reflecting surface includes a diffractive optical element arranged to receive diverging light from the aperture. A focusing element focuses diffracted light to the exit surface. The apparatus may comprise multiple channels and may also include a device for measuring a distance to the object.

44 Claims, 12 Drawing Sheets

U.S. PATENT DOCUMENTS

| | | | | |
|---|---|---|---|---|
| 5,504,629 A | * | 4/1996 | Lim | 359/850 |
| 5,581,639 A | * | 12/1996 | Davies et al. | 385/10 |
| 5,622,904 A | * | 4/1997 | Ohkubo et al. | 501/53 |
| 5,644,396 A | * | 7/1997 | Hopkins, II | 356/301 |
| 5,747,813 A | | 5/1998 | Norton et al. | |
| 5,754,290 A | * | 5/1998 | Rajic et al. | 356/328 |
| 5,796,479 A | | 8/1998 | Derickson et al. | |
| 5,808,763 A | * | 9/1998 | Duck et al. | 398/79 |
| 5,812,262 A | | 9/1998 | Ridyard et al. | |
| 6,002,822 A | | 12/1999 | Strasser et al. | |
| 6,097,863 A | | 8/2000 | Chowdhury | |
| 6,198,864 B1 | * | 3/2001 | Lemoff et al. | 385/47 |
| 6,271,917 B1 | * | 8/2001 | Hagler | 356/310 |
| 6,303,934 B1 | * | 10/2001 | Daly et al. | 250/339.02 |
| 2002/0050557 A1 | | 5/2002 | Kuroda et al. | |
| 2002/0054289 A1 | | 5/2002 | Thibault et al. | |

FOREIGN PATENT DOCUMENTS

| | | |
|---|---|---|
| EP | 0 942 267 A1 | 9/1999 |
| GB | 2 374 142 | 10/2002 |
| JP | 55-087925 | 7/1980 |
| JP | 55087925 A | 7/1980 |
| WO | WO 96/05487 | 2/1996 |
| WO | WO 97/02475 | 1/1997 |
| WO | WO 98/01729 | 1/1998 |
| WO | WO 98/12541 | 3/1998 |
| WO | WO 98/48307 | 10/1998 |

* cited by examiner (a)

(b)

SPECTROMETER

BACKGROUND OF THE INVENTION

1. Field of the Invention

The present invention relates to an apparatus and methods for measuring spectral information of light from at least one object.

2. Background of the Invention

THE TECHNICAL FIELD

Spectroscopy is commonly practised with the use of cumbersome equipment comprising mirrors, lenses, and positioning equipment. However, recently monolithic spectrometers which are feasible for miniaturization, and less susceptible to misalignment, distortion, moisture, malfunction and other defects, have opened up for wider applications.

Known monolithic spectrometers are generally unilateral-type spectrometers which are constructed so that the light entrance is positioned on the same side of the light propagating body as the light exits the body. This, however, limits the use of the spectrometers to applications wherein the detection means can be allowed to occupy space between the spectrometer and the object to be measured.

An example of unilateral-type spectrometers is based on the Czerny-Turner configuration, which limits the minimum size of the compact spectrometer because of the required means for collimating the incoming light onto the diffraction means. Also, the Czerny-Turner configuration requires that entrance and detection means are placed on the same side of the spectrometer body.

Most monolithic spectrometers are not constructed to meet mass producing requirements. Often, the required production process involves steps such as diamond turning, grinding, and polishing. These processes are generally carried out in sequential steps, and known to be very expensive.

Generally, known monolithic spectrometers are rather simple. They consist of only one spectrometer channel, i.e. they can only measure one object at a time. Additionally, known monolithic spectrometers suffer from not being interference free, i.e. the measuring light contains spectral information from both the object and the reference light. This is a disadvantage in many practical situations where knowledge of the reference light is required to obtain precise spectral characteristics of the measured object. Either, the spectral characteristics of the reference light has to be known, or it has to be measured in the same spectrometer either prior to or immediately after measurements have been performed on the object measured. This method is both time consuming and can cause erroneous measurements if the reference light source varies over time.

Additionally, none of the prior art monolithic spectrometers include distance sensing means and consequently they are sensitive to variations in object distance. For a unilateral-type spectrometer (e.g. the Czerny-Turner configuration) it is not straightforward to integrate the distance sensing means within the monolithic spectrometer, because entrance means and detection means are placed on the same side of the spectrometer.

U.S. Pat. No. 5,026,160, Dorain et al., "Monolithic Optical Programmable Spectrograph (MOPS)," discloses a unilateral solid monolithic spectrograph having a Czerny-Turner configuration wherein the incoming light is collimated into a parallel beam of light which is directed onto a diffraction grating and wherein the diffracted beam of light is focused onto a light exit placed on the same side of the monolithic body as the light entrance. The spectrometer has a base of BK7 optical glass to which all components, such as mirrors and gratings, are affixed with optical index matching glue. Affixing the components, however, require critical alignment procedures.

International Application No. WO 97/02475, Rajic et al., "Monolithic Spectrometer and Method for Fabrication of Same", discloses another compact spectrometer utilizing the Czerny-Turner configuration. The spectrometer is a single body of translucent material with positioned surfaces for transmission, reflection, and spectral analysis of light rays. In this configuration, the mirrors and the grating are fabricated in the single body of material, and consequently the critical alignment steps can be avoided.

U.S. Pat. No. 5,159,404, Bittner, "Diode Array Spectrometer", and Company Product Information No 79-802-e, Carl Zeiss Jena, "MMS Spectral Sensors", disclose a compact spectrometer where the grating and the focusing mirror is combined in a single element. This makes it possible to construct a very compact spectrometer.

However, stray light generated by imperfect gratings cannot simply be suppressed.

All these prior art monolithic spectrometers described above are unilateral-type spectrometers. This means that the entrance and detection means are both placed on the same side of the spectrometer, which limits the application areas because the spectrometer might not always be placed as close to the object as is desired.

International Application No. WO 96/05487, Ridyard and Shrewsbury, "Radiation detector", disclose a monolithic transmission spectrometer for UV detection in which a curved reflective face and a planar diffraction grating focus light from the entrance aperture means onto the radiation detector means. This configuration relies on a fixed order of the optical elements of focusing and then diffracting the light which makes it difficult if not impossible to easily compensate or avoid aberrations, in particular chromatic aberration. In addition because the diffracted light is under a large solid angle of the detector, stray light originated from imperfections in the grating cannot easily be suppressed.

All these prior art spectrometers are constructed from a solid block of transparent material (e.g., glass). The production process used is not applicable to mass production, because it is based on diamond turning, grinding and polishing. Furthermore, it has neither been indicated nor suggested to design spectrometers having planar-like structures which are more suited for mass production.

European Application No. EP 0 942 266 A1, H. Teichmann, "Spektrometer" discloses a compact spectrometer which is manufactured by use of replication techniques. This spectrometer is a unilateral spectrometer based on the Czerny-Turner configuration which has the the disadvantages mentioned above.

All the above mentioned prior art spectrometers only include one spectrometer channel, which only allow measurement of one object at a time. Additionally, the prior art techniques are all sensitive to variations in the reference light used to illuminate the object.

Further, inclusion of distance sensing means is not straightforward in these spectrometers just as the cited prior art techniques are sensitive to variations in object distance.

U.S. Pat. No. 5,493,393, Beranek et al., "Planar Waveguide spectrograph", discloses a compact unilateral spectrograph for wavelength division multiplexing applications. The spectrograph is based on glass-optical planar waveguides, and a multi-channel spectrograph is disclosed. The multi-channel spectrograph is manufactured by simply stacking identical waveguide spectrographs on top of each other. This prior art spectrograph is not designed in a planar-like manner, which is feasible for mass production, neither are the additional channels utilized for measuring reference light.

U.S. Pat. No. 4,770,530, Van Aken et al., "Remote Spectrophotometer", discloses a non-compact spectrophotometer including means for directing reference light to a reference detector. In one preferred embodiment, a single detector is used to measure the integrated reference light. This embodiment does not provide a very precise reference measurement. In yet another preferred embodiment, the object and reference light are measured sequentially, which does not provide a precise reference measurement either, because the reference light might have changed. In yet another preferred embodiment, the object and reference light are directed to separate spectrometers, which is not a very cost effective solution. This illustrates why non-compact spectrometers do not provide multi-functionality nearly to the extent compact spectrometers do.

International Application No. WO 98/12541, Hammer et al., "Improved Spectrophotometer", discloses a non-compact spectrophotometer including a reference detector for conducting a reference measurement simultaneously with measurements performed on the object. However, the measurements are performed on the object to be measured after the light has been dispersed by a diffractive grating, i.e. the object is not illuminated by polychromatic light.

International Application No. WO 98/01729, Ellsmore et al., "Spectrometer", discloses a non-monolithic spectrometer with two channels. However, in addition to being non-monolithic, the two channels are not exactly identical because they create different focus for different wavelengths. Further, the measurements are performed on the object to be measured (here a gas, e.g. carbon monoxide) after the light has been dispersed by a diffractive grating, i.e. the object is not illuminated by polychromatic light.

U.S. Pat. No. 4,707,138, Coatney, "Color Measuring and Control Device", discloses a color-detecting device. This prior art does not utilize a spectrometer, but monitor only two known wavelengths to obtain the color (spectral characteristics) of the object. In addition, the color sensor comprises a height detector to provide a signal indicating the distance between the object and color sensor. The height measurements are used to modify the color readings accordingly. The sensor is not compact, neither is the distance sensing means an integrated part of the color sensor, but a separate unit.

DISCLOSURE OF THE INVENTION

Object of the Invention

In an aspect, it is the object of the present invention to provide an improved apparatus and method for measuring spectral information of at least one object. In particular, it is the object to provide an apparatus which is compact and which flexibly can be positioned with respect to the at least one object to be measured.

Also, it is the object of the present invention to provide such an apparatus and method which allow for compensation or reduction of aberration, in particular chromatic aberration.

Further, it is the object of the present invention to provide such an apparatus and method which allow for mass production thereof.

In another aspect, it is the object of the present invention to provide such a method and apparatus for which the measurement of spectral distribution of the at least one object is not influenced by variations in reference light.

In still a further aspect, it is the object of the present invention to provide such a method and apparatus for which the measured spectral distribution of at least one object is not influenced by variations in the distance from the light entrance of the apparatus to the object.

Further objects will appear from the description of the invention and its preferred embodiments.

According to an aspect of the invention, there is provided an apparatus for measuring spectral information of light from at least one object; said apparatus comprising at least one light detecting means; and at least one transparent body having a front side and a back side; said front side including:

an entrance surface having positioned in or near thereof at least one entrance aperture means for receiving light from the at least one object, and at least one reflecting surface; and said back side including:

at least one other reflecting surface for reflecting light received from said at least one entrance aperture means to said at least one reflecting surface of the front side, and an exit surface; said exit surface being arranged in a mutual relationship with said at least one light detecting means; said detecting means being positioned in or near thereof, or positioned at a distance there from, for detecting the reflected light from said at least one reflecting surface of the front side;

said at least one other reflecting surface of the back side, said at least one reflecting surface of the front side, or both, having at least one diffractive optical element (32) and/or at least one focusing means (33);

said at least one diffractive element and said at least one focusing means being arranged so that the transmitted light is diffracted before being focused; and said at least one transparent body being transparent to the lights from the object, said reflecting surface of the back side, and said other reflecting surface of the front side;

which apparatus is compact.

Also, the arrangement of the at least one diffractive element and the at least one focusing means so that the transmitted light is diffracted before being focused ensures that compensation or reduction of aberration, in particular chromatic aberration can easily be obtained.

Compensation or reduction of aberration can be obtained in any suitable manner involving aberration correcting means under or after the focusing process.

In a preferred embodiment, the apparatus further comprises aberration correcting means.

In a particularly preferred embodiment, the aberration correcting means comprises that the at least one focusing means is aspheric whereby the wavelength dependent reflection by the aspheric focusing means is used to correct the diffracted light of various wavelengths to the desired focus.

In another particularly preferred embodiment, the aberration correcting means comprises tilting a planar exit surface or providing an aspheric exit surface whereby the diffracted light focused by the focusing means is refracted to the desired focus.

In still another particularly preferred embodiment, the aberration correcting means comprises a combination of the at least one focusing means being aspheric and the exit surface being tilted whereby the aberration compensation or reduction can be made more effective.

Further, according to the invention light detecting means are separated from the entrance aperture means, whereby the apparatus can be positioned in a flexible manner with respect to the object(s) to be measured. That is, the apparatus can be positioned very close to one or more objects. This is e.g. particularly useful for applications of compact spectrometers to color measurements in printing machines.

In many applications it is desired to have a large resolution of the spectrometer. This can be achieved by providing a long light path in the spectrometer between the entrance aperture means and detecting means.

In a preferred embodiment, the front side includes at least one further reflecting surface; and the said back side includes at least one further reflecting surface; said further reflecting surfaces being arranged to reflect light more times before being received by the at least one focusing means, the at least one diffractive means, or both whereby the light path can be increased and consequently the resolution can be increased.

The light from the object to be measured enters the spectrometer through an entrance aperture means. The aperture means serves to achieve a suitable resolution of the spectrometer.

Preferably the entrance aperture means comprises of a rectangular slit, but the light might also be provided through optical waveguide means, in particular optical fiber means, or through other appropriate aperture means, thereby ensuring a desired resolution of the spectrometer and a suitable reception of light.

In another preferred embodiment, the entrance aperture means further comprises a wavelength bandpass filter whereby it is achieved that the spectrometer only analyzes a desired wavelength bandwidth of light, which is particularly useful in order to optimize the signal-to-noise ratio.

The at least one diffractive optical element is preferably planar or aspheric whereby it can easily be adapted to said at least one reflecting surface of the front and back sides depending on their particular function.

In another preferred embodiment, the diffractive optical element is a blazed grating whereby an improved efficiency of the spectrometer is achieved, said efficiency being defined as the amount of light distributed across the light detecting means compared to the amount of light entering the entrance aperture means.

The at least one focusing means is preferably an aspheric surface, whereby it is achieved that the optics design of a compact spectrometer can be realized with fewer aberrations. In this regard, the term "aspheric surface" is known in the art, see e.g. ZEMAX, Optical Design Program, User's Guide Version 7.0, Focus Software, Inc., Tucson, Ariz. (1998) p. 13–4. We note that a spherical surface, which is commonly used in many standard lenses, is a specie of an aspheric surface.

The term "aberrations" is intended to designate the various forms of aberration, e.g. spherical and chromatic aberration, known in the art, e.g., see E. Hecht, "Optics," Addison-Welsey, 1987, Section 6.3.

The light detecting means can be positioned either in or near the exit surface of the transparent body of the apparatus, e.g. compact spectrometer, or it can be positioned at a distance from the exit surface. By positioning the light detecting means in or near the exit surface, a very rugged spectrometer is achieved, which is advantageous in many applications where the spectrometer might be subject to vibrations during its use. Also it is advantageous with respect to long term stability of the spectrometer.

The light detection means may be positioned below or above the surface of the exit surface face of the back side of the transparent body. In a preferred embodiment the detection means is positioned below the surface of the exit surface thereby ensuring a more robust spectrometer with less sensitivity of having the components in or near the surface of exit face destroyed by external strikes or the like to the body.

In a preferred embodiment the light detecting means comprises an array detector, whereby it is achieved that each element of the array detector corresponds to either a single wavelength or a narrow bandwidth of wavelengths. Hereby, simultaneous measurement of a desired bandwidth range of wavelength can be measured simultaneously.

In another preferred embodiment the light detection means further comprises a wavelength bandpass filter, whereby it is achieved that the light detection means only analyzes the desired wavelength bandwidth of light which is particularly useful in order to optimize the signal-to-noise ratio.

In a preferred embodiment, the transparent body is a unitary body or a composed body. Preferably the unitary or composed body is replicated in optical plastic material, e.g. by embossing or molding, whereby it is possible to mass-produce e.g. a very cheap compact spectrometer.

In a preferred embodiment the unitary or composed body is replicated such that the reflective surfaces are positioned below the respective surfaces of the front side and back side thereof. This embodiment is particularly advantageous, because the final spectrometer exhibits a box shape with parallel outer surfaces.

It is particularly preferred that the transparent body is a composed body comprising a front part, a back part, and optionally an intermediate part; said front part incorporating said entrance aperture means, said at least one diffractive optical element and/or said at least one focusing means; and said back part incorporating said exit surface, said at least one diffractive optical element and/or said at least one focusing means.

The intermediate part may be present or not depending on the application. In a preferred embodiment, said optionally intermediate part consists of a material selected from the group consisting of a low cost transparent material, a thermally stable transparent material, and a filtering material, or a combination thereof.

The parts of the composed body might be coupled by e.g. optical cement.

The unitary or composed body might also be assembled by single pieces of optical elements, e.g. replicated optical elements or glass optical elements, which are coupled with e.g. optical cement.

The transparent body is preferably covered with light absorbing material, e.g., black paint, apart from apertures necessary for light passage, e.g. the entrance aperture means and at the exit surface. The light absorbing material serves to suppress stray light, i.e. to suppress multiple scattered light inside the transparent body that adds noise to the measurements. The light absorbing material further serves to prevent ambient light to enter the spectrometer and thus add noise to the measurements. Additionally it serves to prevent light from the entrance aperture means to be guided directly to the light detection means, which is possible in a transmission spectrometer, and crucial for the measurements because this effect cannot easily be eliminated electronically.

Imperfections in the diffractive optical element cause a substantial amount of stray light in spectrometers. By arranging the optical elements so that light from the diffractive optical element cannot be scattered directly onto the light detecting means, inclusion of light absorbing material can eliminate or reduce this highly undesired noise source.

Preferably, the light absorbing material has an index of refraction identical to or very close to the index of refraction of the spectrometer unit, whereby reflections from the interface between said light absorbing material and said spectrometer body is minimized. Hereby it is achieved that the amount of stray light is further suppressed.

In a preferred embodiment where the transparent body is molded, the light absorbing material is also molded into said body.

In yet another preferred embodiment, the light absorbing material is coated, e.g. painted, onto said transparent body.

In another preferred embodiment where the transparent body is a composed body, light absorbing material is positioned inside the composed body, e.g. between the composed units, whereby it is possible to further suppress the amount of stray light and eliminate light scattering directly from the entrance aperture means to the light detection means, because extra sets of apertures can be included.

In a preferred embodiment, the apparatus comprises at least two spectrometer channels, e.g. a multi-channel spectrometer comprising at least two transparent bodies, each of which constitutes said channels.

The multi-channel spectrometer might be realized by positioning the channels in parallel, but the channels can also be placed in continuation of each other in a so-called serial spectrometer.

In a preferred embodiment where the multiple channels are placed in parallel, the light detection means preferably comprises of an array sensor with a separate array for each channel. In contrast hereto, in a serial spectrometer, the different channels illuminate separate parts of the single-array detector.

The advantage of the parallel multi-channel spectrometer is that the sensitivity can be adjusted separately for each channel at the cost of constructing extra electronics.

In contrast hereto, in the serial multi-channel spectrometer, the different channels can not be adjusted individually, but the advantage is that this configuration requires less electronics.

In a preferred embodiment, the apparatus, e.g. either the transmission spectrometer or the multi-channel spectrometer, further comprises at least one reference light source arranged to illuminate the object.

The object can be illuminated either in a reflection or a transmission mode, which is further described below. The illuminating light can be guided to the object either by free space propagation, e.g. combined with lens arrangements, or via light guiding means, e.g. an optical fiber.

In a preferred embodiment, the object is illuminated in a reflection mode, here defined as a mode wherein the object is illuminated on the side facing the spectrometer, i.e. light scattered off or reflected from the object is received by the entrance aperture means of the apparatus. Typical objects illuminated in reflection mode comprise objects that are not transparent to the wavelength bandwidth of the illuminating light, e.g. non-transparent solid surfaces such as printing paper.

In another preferred embodiment, the object is illuminated in a transmission mode, here defined as a mode wherein the object is illuminated on the side not facing the spectrometer, i.e. light transmitted through the object is received by the entrance aperture means of the apparatus. Typical objects illuminated in transmission mode comprise of objects that are transparent to the wavelength bandwidth of the illuminating light, e.g. transparent gases or liquids.

Generally, the at least one reference light source should emit polychromatic light in a wavelength range suitable for the application. For visible light applications, preferably the at least one reference light source is a continuous light source or a flash-type light source, preferably a white-light LED or a xenon lamp of either the continuous type or flash type.

Other preferred lamps are tungsten, metal-halide such as mercury-halide, halogen or deuterium lamps. Ambient light can also be used as light source, e.g. sunlight. A series of narrow-bandwidth light sources can also be used. In a preferred embodiment, a series of LED's is used, where the individual wavelength bandwidths overlap and consequently creates polychromatic light.

In a preferred embodiment, part of the illuminating light is guided to the entrance of at least one of the spectrometer channels via light guiding means or via free space propagation. This channel is here defined as the reference channel.

In a preferred embodiment, said transparent body comprises at least one measuring part for measuring light from the object and a reference part for measuring light from the at least one reference light source whereby the measurement is independent of variations in the reference light.

In a particularly preferred embodiment at least one spectrometer channel is used to analyze light from the at least one object whereas another spectrometer channel, the reference channel, is used to simultaneously analyze the spectral distribution and intensity of the reference light source used to illuminate the object to be analyzed.

This configuration is particularly advantageous because simultaneous readout of reference light source and object provides a means for rapid and more accurate measurements. Additionally, simultaneous measurements of object and reference light make the measurements insensitive to any variation in the reference light used to illuminate the object.

The spectrometer channel used to monitor the reference light can be illuminated with part of the reference light either via optical fiber means or other waveguiding means. In a preferred embodiment, a special base plate is used to guide part of the reference light to the reference channel.

In a preferred embodiment the apparatus further comprises means for removing the spectral influence of the reference light in the light measured from the object. The reference light correcting means communicate with the light detection means.

Hereby, object light is measured independent of variations in the reference light.

Typical reference light correcting means comprise computing means for determining light intensities of both object light and reference light and calibration procedures including corrections for cross interferences in both channels.

In a preferred embodiment, the ratio of the signal entering the reference channel to the ratio illuminating the object is known, and the reference light correcting means simply accounts for the ratio and subtracts the reference light from the object light.

In another preferred embodiment, the spectrometer undergoes a first calibration with a calibration object, where after the changes of the reference light is monitored in the reference channel. The reference light correcting means then corrects for the changes in the reference light compared with the reading of reference light taken at the calibration.

In a preferred embodiment, the apparatus further comprises a light spot source for illuminating a light spot onto the object; and a distance sensing means for measuring the distance between the object and said entrance aperture means, whereby the spectral information of the object is measured independent of variations in the object distance.

Any of the spectrometer geometries described above can include distance sensing means, but in a preferred embodiment, the distance sensing means is combined with a transmission spectrometer, whereby the distance sensing means can reuse the spectral sensing means.

In another preferred embodiment, the distance sensing means is combined with a multi-channel spectrometer, where at least one channel is used as reference channel.

The distance sensing means includes a light spot source for illuminating a light spot onto the object. In a preferred embodiment the light spot source comprises of a monochromatic light source, e.g. a laser diode, or a source with limited wavelength bandwidth, e.g. an LED.

In a preferred embodiment the distance sensing means includes means for focusing the light spot on the object onto the spot detection means. The focusing means can either be a refractive optical element, e.g. a lens, or a diffractive optical element.

In a preferred embodiment the focusing means further comprises a wavelength bandpass filter allowing only passage of the light within the bandwidth of the light spot source. Hereby, the amount of object light entering the spectrometer via the focusing means is minimized.

In a preferred embodiment, the spot detecting means is an array detector or a position sensitive detector.

In a particular preferred embodiment, the spot detecting means is the same as the light detecting means, whereby is achieved that the spectral measurement is performed simultaneously with the distance sensing. This geometry is particularly advantageous when the distance sensing means is combined with a transmission spectrometer.

In a preferred embodiment, either the spot size or the spot position is determined on the spot detection means.

In a preferred embodiment, the object distance is determined by geometrical magnification, whereas in another preferred embodiment, the object distance is determined by triangulation. Both methods are well known in the art.

In a preferred embodiment the apparatus further comprises means for removing the influence of the object distance in the light measured from the object. The object distance correcting means communicate with the spot detection means.

Hereby, object light is measured independent of variations in object distance.

In a preferred embodiment, the changes in object light intensity entering the spectrometer caused by changing object distance is known, and the object distance correcting means simply accounts for the changes when the object distance is known.

In another preferred embodiment the distance sensing means is combined with a multi-channel spectrometer in which at least one channel is used as reference channel. The spectrometer undergoes a first calibration with a calibration object, where the received object intensity is measured at fixed object distances. Here after the changes of the object light versus object distance is known, and the distance correcting means is correcting here fore.

In another aspect, the present invention provides an apparatus for measuring spectral information of light from at least one object; said apparatus comprising
at least one light detecting means; and
at least one transparent body including:
an entrance surface having positioned in or near thereof at least one entrance aperture means for receiving light from the at least one object, and
one or more reflecting surfaces; and
an exit surface; said exit surface being arranged in a mutual relationship with said at least one light detecting means positioned in or near thereof, or positioned at a distance therefrom, for detecting the reflected light from said one or more reflecting surfaces;
said one or more reflecting surfaces having at least one diffractive optical element and/or at least one focusing means;
said at least one transparent body being transparent to the lights from the object and said one or more reflecting surfaces, and
said at least one transparent body being composed of several parts for measuring light from several objects.

This apparatus still has the advantage of being compact and easy to position with respect to the objects. It is however not limited to the transmission configuration whereby entrance aperture means and detecting means may be positioned on the same face of the transparent body.

In a preferred embodiment, the several parts for measuring light from several objects comprise at least one measuring part for measuring light from one or more objects and a reference part for measuring light from a reference light source.

Preferred embodiments including the same features for this aspect of the invention are similar to those described in the present general and detailed description including the examples. In particular, the features of the embodiments described in the sections "Transmission Spectrometer", "Multi-channel Transmission Spectrometer" and "Transmission Spectrometer with Distance Sensor", hereby included here by reference.

In another aspect, the present invention provides an apparatus for measuring spectral information of light from at least one object; said apparatus comprising
at least one light detecting means;
at least one light spot source for illuminating a light spot onto the at least one object; and
at least one transparent body; said body including:
an entrance surface having positioned in or near thereof at least one entrance aperture means for receiving light from the object, and
one or more reflecting surfaces; and
an exit surface; said exit surface being arranged in a mutual relationship with said at least one light detecting means; said detecting means being positioned in or near thereof, or positioned at a distance therefrom, for detecting the reflected light from said one or more reflecting surfaces; and
distance sensing means for measuring the distance between the at least one object and said entrance aperture means;
said one or more reflecting surfaces having at least one diffractive optical element and/or at least one focusing means; and
said at least one transparent body being transparent to the lights from the object and said one or more reflecting surfaces.

This apparatus has the advantage of correcting for influences of distance variations from the apparatus to the at least one object.

Preferred embodiments including the same features for this aspect of the invention are similar to those described in the present general and detailed description including the examples.

In another aspect, the present invention provides an apparatus for measuring spectral information of light from at least one object; said apparatus comprising at least one light detecting means;

at least one light spot source for illuminating a light spot onto the at least one object;

at least one transparent body including:
an entrance surface having positioned in or near thereof at least one entrance aperture means for receiving light from the at least one object, and
one or more reflecting surfaces; and
an exit surface; said exit surface being arranged in a mutual relationship with said at least one light detecting means positioned in or near thereof, or positioned at a distance therefrom, for detecting the reflected light from said one or more reflecting surfaces;
said one or more reflecting surfaces having at least one diffractive optical element and/or at least one focusing means; and distance sensing means for measuring the distance between the at least one object and said entrance aperture means;

said at least one transparent body being transparent to the lights from the object and said one or more reflecting surfaces, and said at least one transparent body being composed of several parts for measuring light from several objects.

In a preferred embodiment, the several parts for measuring light from several objects comprise at least one measuring part for measuring light from one or more objects and a reference part for measuring light from a reference light source.

In addition to the advantages of compactness of the general multi-channel spectrometer described above, this apparatus has the advantage of correcting for influences of distance variations to the object or objects. This is particularly advantageous since multi-channel spectrometers generally do not include this correction.

Preferred embodiments including the same features for this aspect of the invention are similar to those described in the present general and detailed description including the examples.

In another aspect, the present invention provides an apparatus for measuring spectral information of light from at least one object; said method comprising:

measuring light from at least one object by an apparatus comprising light detection means and at least one transparent body according to the invention;

said method further comprising:
illuminating the at least one object by light from at least one reference light source;
simultaneously, measuring object light from the illuminated objects in at least one measuring channel and measuring reference light from the at least one reference light source in at least one reference channel; and
removing spectral influence of the reference light in the measured light from the object.

In a preferred embodiment, the spectral influence of reference light in the object light is removed by subtracting the measured reference light from the measured object light.

In another preferred embodiment, the spectral influence of the reference light in the object light is removed by correcting for changes in the reference light compared to a reference measurement taken at a first calibration.

In still another preferred embodiment, the method further comprising the steps of:
illuminating light from a light spot source onto the object;
focusing light from the light spot on the object onto the spot detection means; and
determining the spot size or the spot position on said spot detection means; and determining the distance to the object, preferably by geometrical magnification or by triangulation.

It is particularly advantageous to measure the spectral distribution of multiple objects, thus allowing parallel and fast measurements. Additionally, it is advantageous to measure the spectral distributions of at least one object independently of variations in reference light and variations in object distance. Particularly if the object is illuminated by flash type illumination means, e.g. a xenon flash tube, the object light vary from flash to flash.

In another aspect, the present invention provides an apparatus for measuring spectral information of light from at least one object; said method comprising:

measuring light from at least one object by an apparatus comprising light detection means and at least one transparent body according to the invention;

said method further comprising:
correcting the influence of distance between the objects and the apparatus on the measured object light;
said correction comprising measuring said distance by:
illuminating light from a light spot source onto the object;
focusing light from the light spot on the object onto the spot detection means;
determining the spot size or the spot position on said spot detection means; and
determining the distance to the object, preferably by geometrical magnification or by triangulation.

Hereby, it is possible to measure the spectral distribution of the object independent of variations in object distance, which is particularly useful e.g. when measuring color in printing devices where the distance between the light entrance means and the printer paper can vary.

BRIEF DESCRIPTION OF THE DRAWINGS

In the following, the invention is further disclosed with detailed description of preferred embodiments, reference being made to the drawings in which.

DETAILED DESCRIPTION

Figure 1:
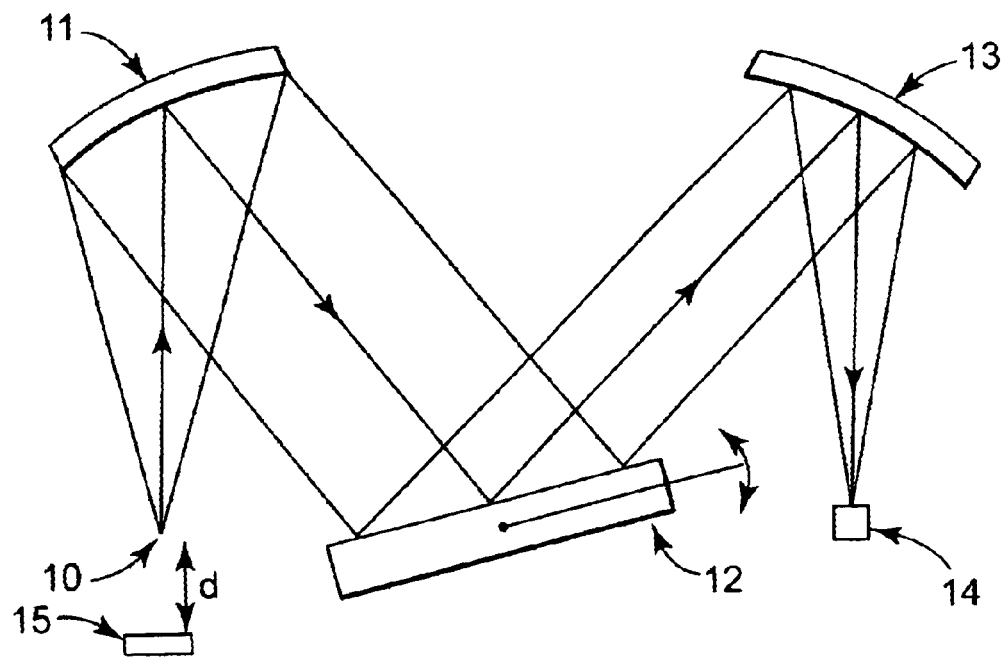
FIG. 1 shows a cross-sectional sketch of the optical layout of a conventional spectrometer

The optical layout of a typical conventional spectrometer is shown in FIG. 1. A source 10 of light is typically a slit or an aperture illuminated by light from an object 15 positioned at a distance d therefrom. Light from the source passes to a first parabolic mirror 11, which produces and directs a plane wave towards a diffractive means 12, e.g. grating. The diffracted plane wave is collected by a second parabolic mirror 13, which reflects the light and focuses an image of the source onto a detector 14. Since the angle of diffraction of the light from the diffractive means varies with wavelength, the spectrometer effectively produces an infinite number of images, each at different wavelength, spread across the plane of the detecting means. In a conventional spectrometer, the relative alignment of the slit, mirrors, grating, and detector is crucial to the reliability of the spectrometer. Commonly, the detector can only measure one wavelength at a time. Consequently, measurement of other wavelengths or the bandwidth of a spectral line requires physical movement of the grating.

Figure 2:
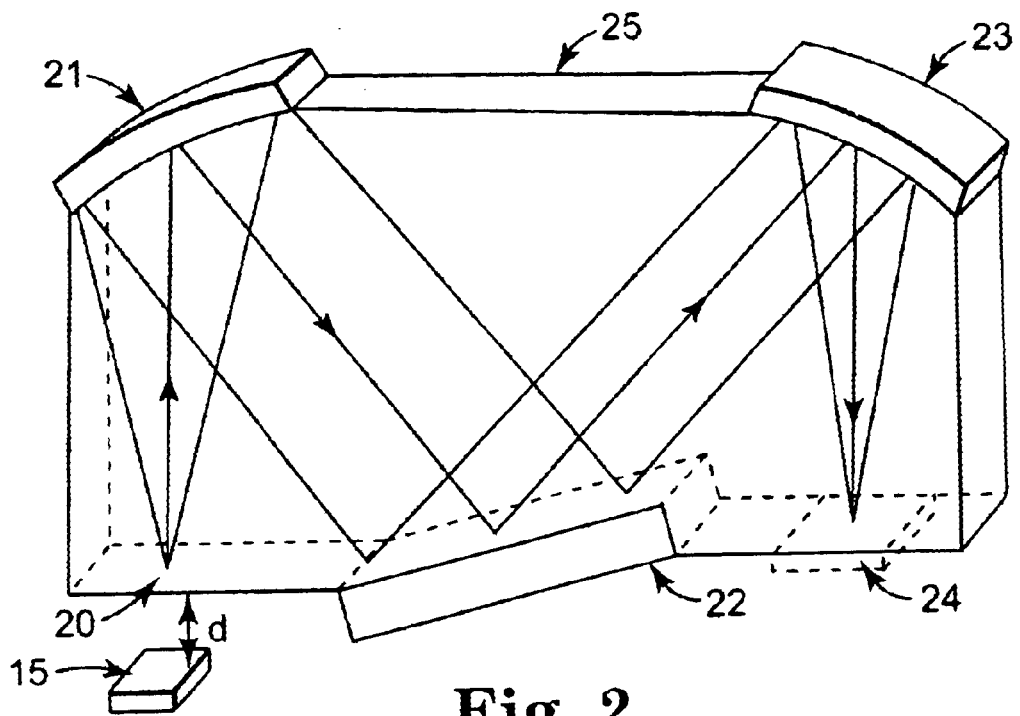
FIG. 2 shows a three dimensional sketch of the optical layout for a prior art compact spectrometer made in a monolithic material.

With improved detector technology, spectrometers using linear detector arrays can measure simultaneously the intensities at multiple wavelengths. Consequently, no moving parts are necessary in the spectrometer. The optical layout of a typical prior art compact, monolithic spectrometer 25 is shown in FIG. 2. A source 20 of light is typically a slit or aperture illuminated by light from an object 15 positioned at a distance d therefrom. Light from the source passes to a first parabolic mirror 21, which produces and directs a plane wave towards a diffraction grating 22. The diffracted plane wave is collected by a second parabolic mirror 23 which reflects the light and focuses an image of the source onto a linear detector array 24. Since the angle of diffraction of the light from the diffraction grating varies with wavelength, the spectrometer effectively produces an infinite number of images, each at different wavelength, spread across the plane of the detector.

PREFERRED EMBODIMENTS

Figure 3:
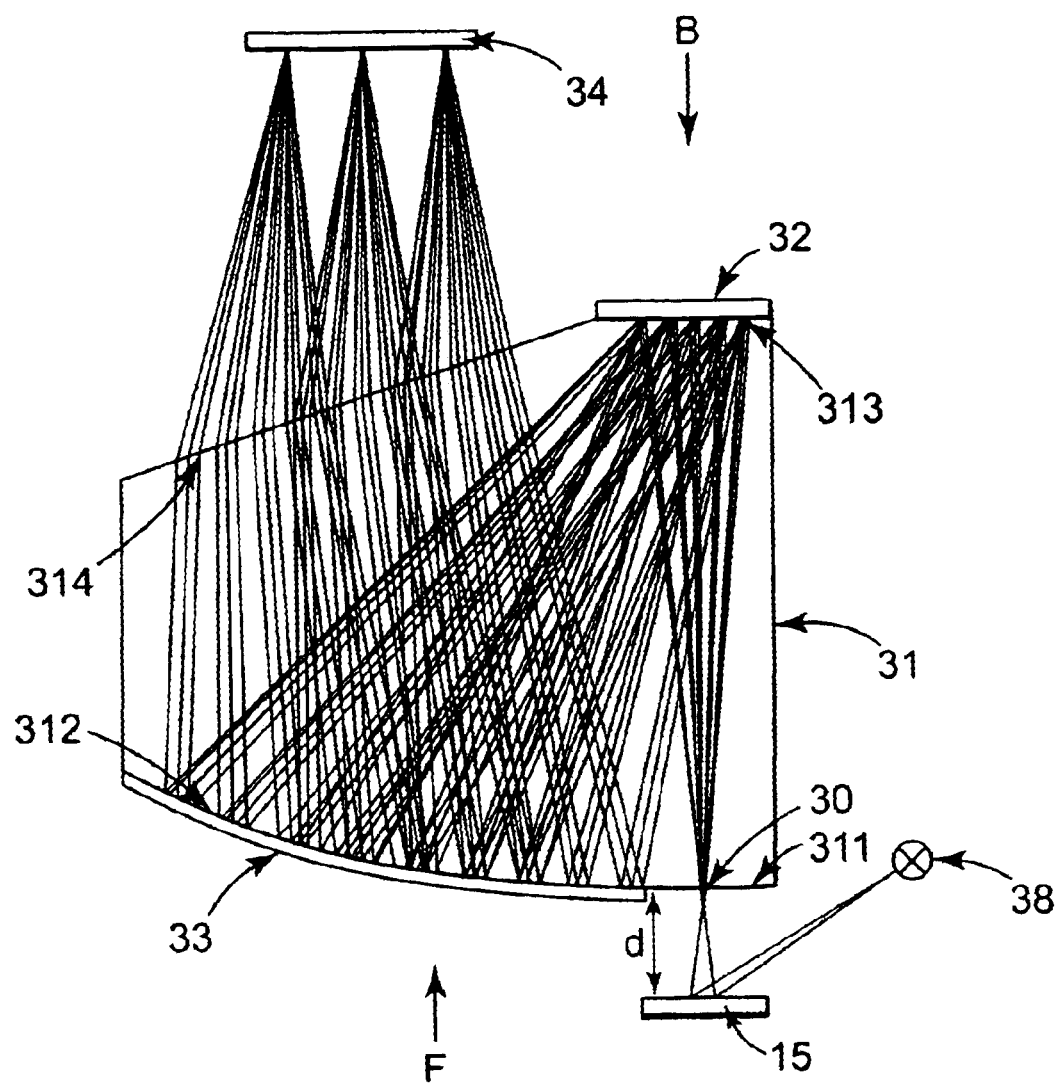
FIG. 3 shows a preferred embodiment of the present invention in which the ray-tracing simulations are illustrated.

FIG. 3 shows a cross-sectional sketch of a ray-tracing simulation of a single channel including a transparent body 31 in a preferred transmission spectrometer embodiment. A light source 38 illuminates the object 15 positioned in front F of the transparent body 31. The object is positioned the distance d from the entrance aperture means 30, positioned at the entrance surface 311. In this example the entrance aperture means comprises of a rectangular slit. Inside the transparent body 31 the light propagates towards a reflecting surface 313 of the back side at which a diffractive optical element 32 (here a blazed grating) diffracts the light towards a reflective surface 312 of the front side, in this preferred embodiment an aspheric mirror 33. The aspheric mirror focuses the diffracted wavelengths across the plane of the light detecting means 34, in this example comprising of an array detector and placed opposite the entrance means at the back side B of the transparent body. The light detecting means is placed at a distance from the exit surface 314, which is tilted to correct for chromatic aberrations.

Figure 4:
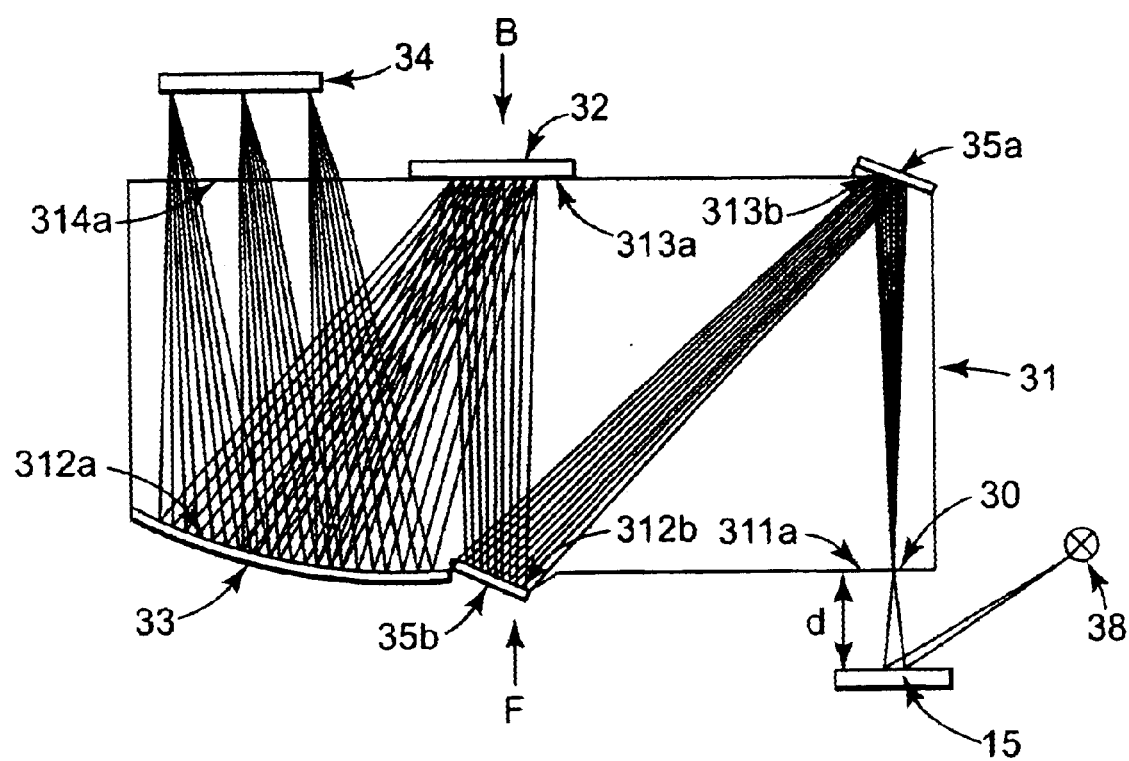
FIG. 4 shows a preferred embodiment of the present invention in which the ray-tracing simulations are illustrated for an apparatus with multiple reflective surfaces leading to improved resolution.

Ray-Tracing Simulation of Compact Transmission Spectrometer with Multiple Reflective Surfaces and Parallel Front Side and Back Side FIG. 4 shows a cross-sectional sketch of a ray-tracing simulation of a single channel including a transparent body 31 in a preferred transmission spectrometer embodiment. A light source 38 illuminates the object 15 positioned in front F of the transparent body 31. The object is positioned the distance d from the entrance aperture means 30, positioned at the entrance surface 311a. In this example the entrance aperture means comprises of a rectangular slit. Inside the transparent body 31, the light propagates towards a further reflecting surface 313b of the back side at which a planar mirror 35a directs the light towards a further reflective surface 312b of the front side at which a planar mirror 35b directs the light towards the reflective surface 313a of the back side, at which a diffractive optical element 32 (here a blazed grating) diffracts the light towards the reflective surface 312a of the front side, in this preferred embodiment an aspheric mirror 33. The aspheric mirror focuses the diffracted wavelengths across the plane of the light detecting means 34, in this example comprising of an array detector and placed opposite the entrance means at the back side B of the transparent body. The light detecting means is placed at a distance from the exit surface 314a.

In this preferred embodiment the diffractive optical element 32 and the detecting means 34 are arranged in parallel planes or coinciding planes. Also, the entrance surface 311a and the exit surface 314a are parallel.

Other preferred transmission spectrometer geometries will be shown in the following, but will not be substantiated by ray-tracing simulations.

Figure 5:
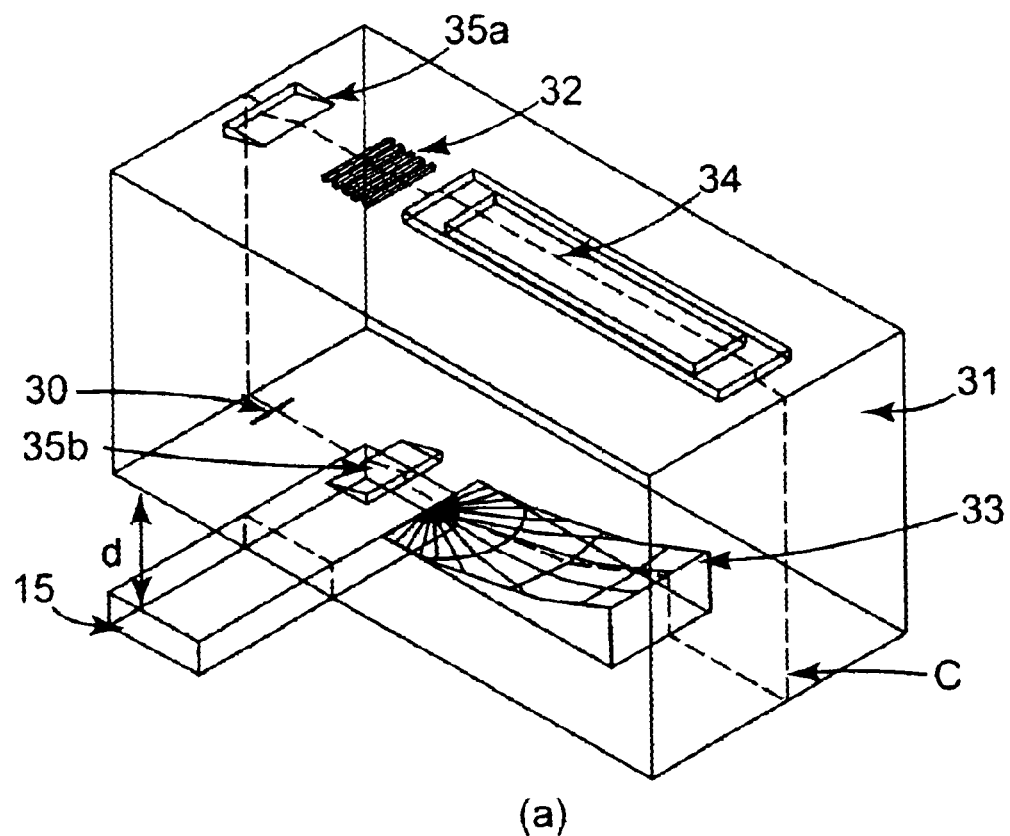
FIG. 5A shows a three dimensional sketch of a preferred embodiment in which the apparatus comprises parallel front sides and back sides.
FIG. 5B shows a cross-sectional sketch of the preferred embodiment shown in FIG. 5A in which the reflecting surfaces are placed below the respective surfaces of the front side and back side.
Figure 5:
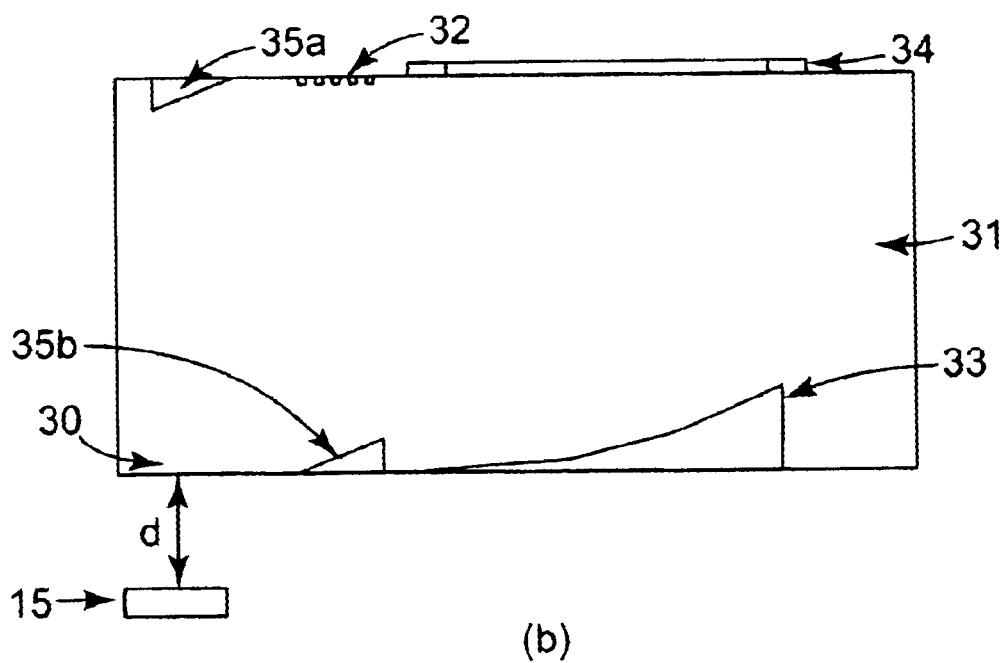

FIG. 5A shows a three dimensional sketch of a preferred embodiment in which the reflective surfaces (i.e., the planar mirrors 35a, 35b, the diffractive optical element 32, and the aspheric mirror 33) are positioned below the respective surfaces of the front side and back side. This is clearly illustrated in FIG. 5B, which shows a cross-sectional sketch taken at the plane C from FIG. 5A.

The principle of the ray-tracing simulations is illustrated in FIG. 4 with the exception that that the aspheric mirror 33 now focus the diffracted wavelengths across the detecting means 34 which is now positioned at the exit surface.

Figure 6:
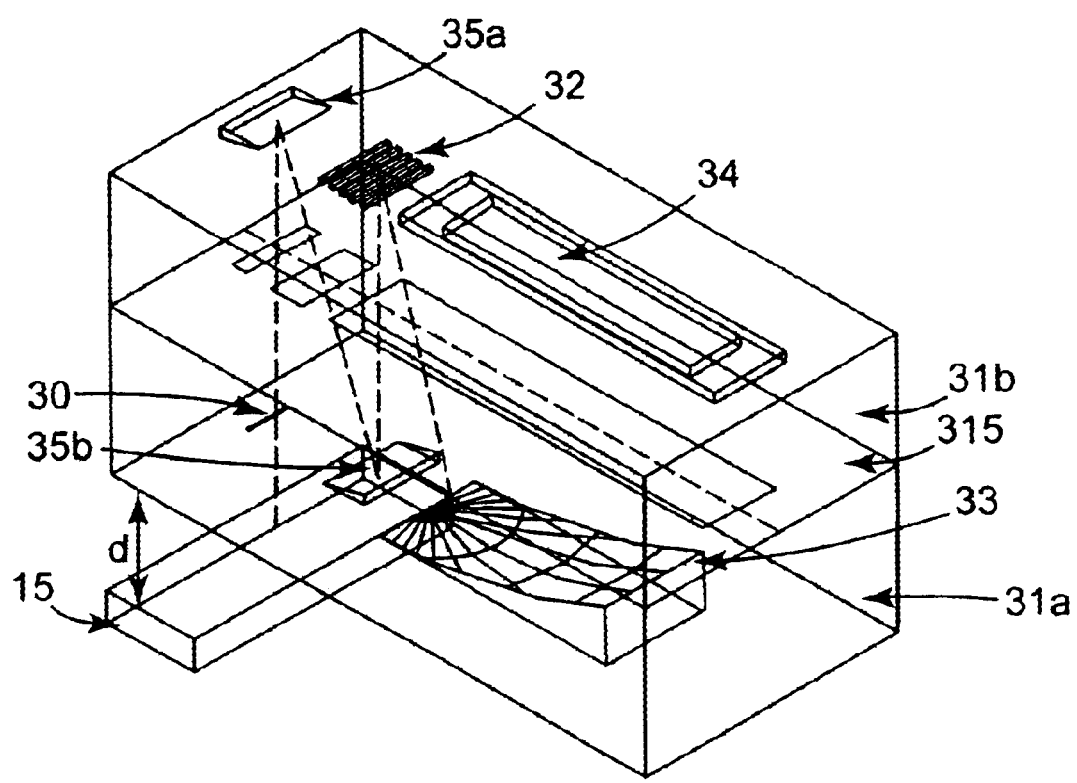
FIG. 6 shows a three dimensional sketch of a preferred embodiment in which the apparatus is a composed body in which light absorbing material is positioned inside the composed body.

FIG. 6 shows a three dimensional sketch of a preferred embodiment in which the spectrometer body is a composed body (31a, 31b) and in which light absorbing material 315 is placed between said composed bodies. The spectrometer is similar to the transmission spectrometer illustrated in FIG. 5 and described above.

The composed body comprising a front part 31a and a back part 31b. The front part is incorporating an entrance aperture means 30, a further planar mirror 35b, and the focusing means 33. The back part is incorporating a further planar mirror 35a, the diffractive optical element, and the exit surface.

This preferred embodiment is composed of two parts (31a, 31b).

In another preferred embodiment, the transparent composed body further comprises an intermediate part.

Figure 7:
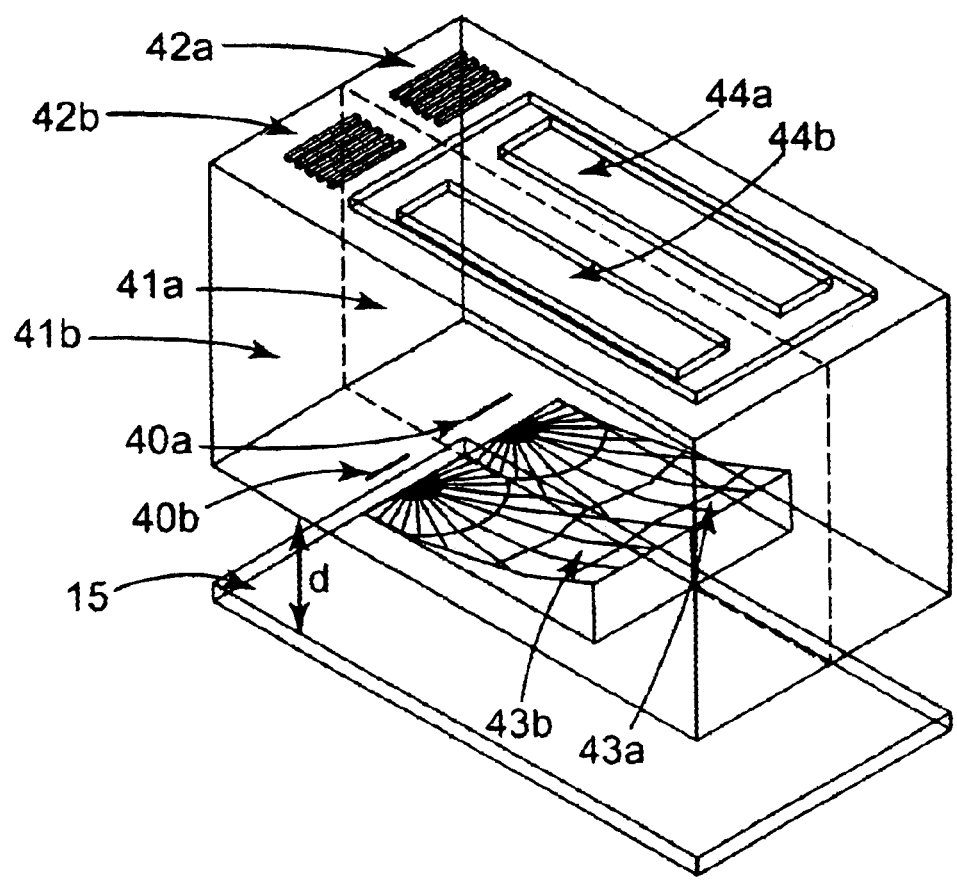
FIG. 7 shows a three dimensional sketch of a preferred embodiment in which the apparatus consists of two parallel spectrometer channels.

FIG. 7 shows a three dimensional sketch of a preferred embodiment that consists of two parallel spectrometer channels. In the preferred embodiment shown in FIG. 7, the dual channel spectrometer comprises of a measurement channel 41a to measure light from the object 15 and a reference channel 41b to measure light from the reference light source 38 (not shown in FIG. 7). The light enters each spectrometer channel through an aperture, in this example rectangular slits (40a, 40b), and each channel is an independent transmission spectrometer having respective diffractive optical elements (42a and 42b) and working according to the ray-tracing simulation illustrated in FIG. 3 with the exception that that the aspheric mirrors (43a, 43b) now focus the diffracted wavelengths across the detecting means (44a, 44b) which is now positioned at the exit surface.

The light from the measurement channel 41a is focused onto the light detecting means 44a whereas the light from the reference channel is focused onto the light detecting means 44b.

Preferably the detecting means (44a, 44b) comprises of a dual line sensor, said line comprising of an array sensor. In this example the array sensor is a dual line sensor of 2×256 pixels (S4801-256Q), from Hamamatsu Photonics, JP.

An illustration of simultaneous measurement of object light and reference light is shown in Example 1.

Figure 8:
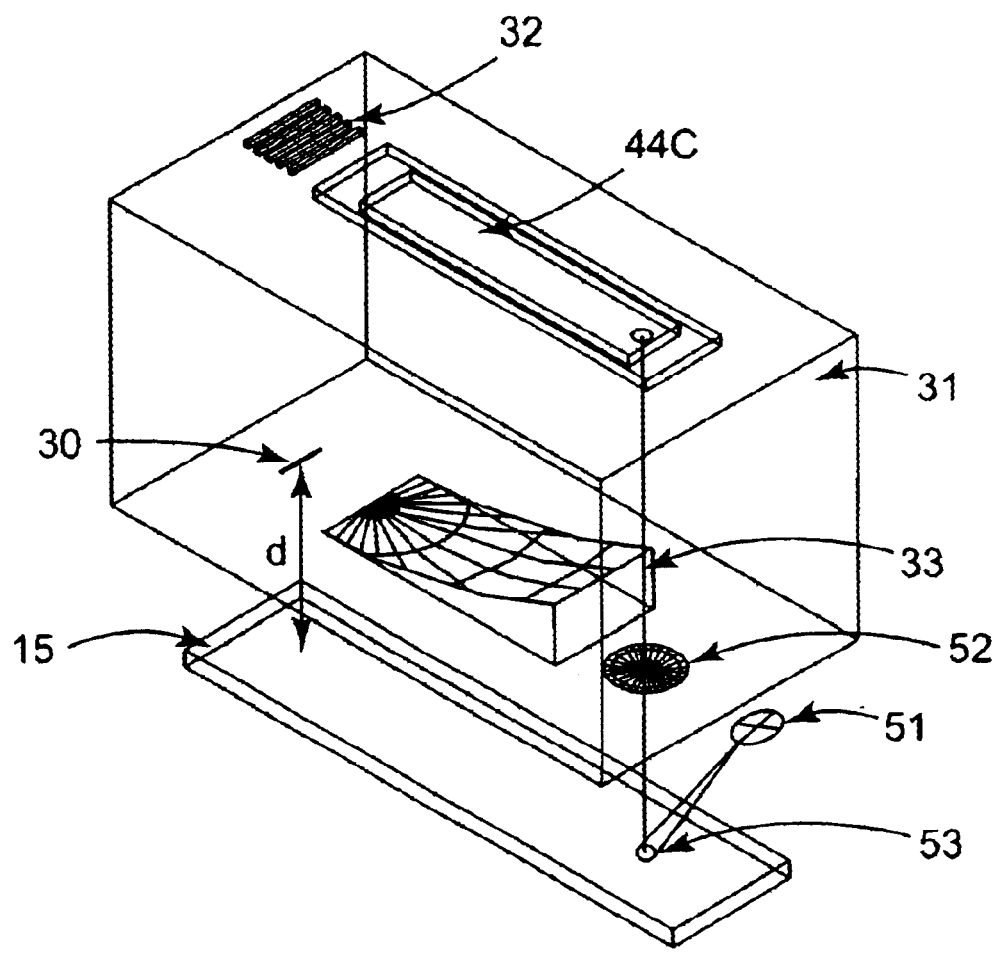
FIG. 8 shows a three dimensional sketch of a preferred embodiment in which one spectrometer channel is combined with distance sensing means.

FIG. 8 shows a three dimensional sketch of a preferred embodiment in which one spectrometer channel 31 is combined with a distance sensing means. The spectrometer channel is similar to the transmission spectrometer illustrated in FIG. 7 and described above.

The distance sensing means preferably comprises of a light spot source 51 for focusing a light spot 53 onto said object 15. A focusing means 52 is integrated within the compact spectrometer unit 31 and focuses the light spot from the object onto said spot detecting means 44c. In this preferred embodiment, the light detecting means and the spot detecting means is combined in a single detecting means 44c.

For the preferred embodiment shown in FIG. 8, the light spot source 51 illuminates the object 15 under an angle. If the object distance is changed, the position of the illuminated light spot on the spot detecting means 44c is displaced in the longitudinal direction of the detecting means. I.e., the object distance is determined by triangulation.

An illustration of simultaneous measurement of object light and spot position for two different object distances is shown in Example 2.

Figure 9:
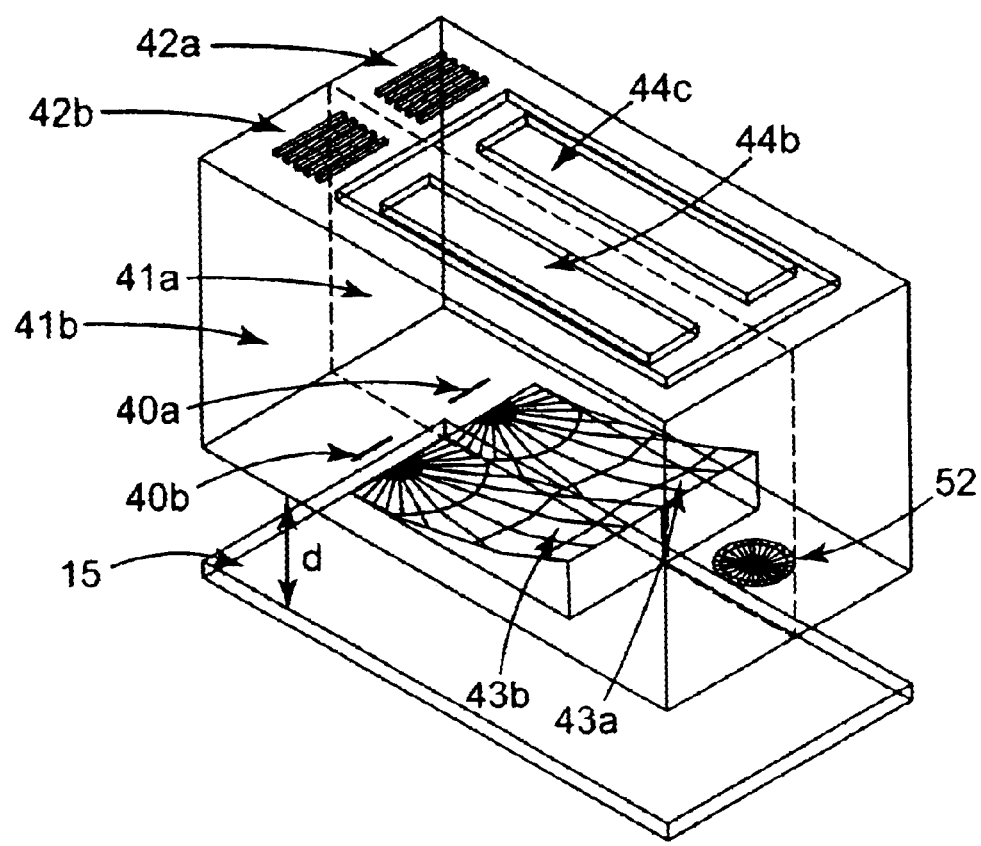
FIG. 9 shows a three dimensional sketch of a preferred embodiment in which two parallel spectrometer channels are combined with a distance sensing means.

FIG. 9 shows a three dimensional sketch of another preferred embodiment in which a dual channel spectrometer is combined with a distance sensing means. That is a combination of the preferred embodiments illustrated in FIGS. 7 and 8 respectively.

Figure 10:
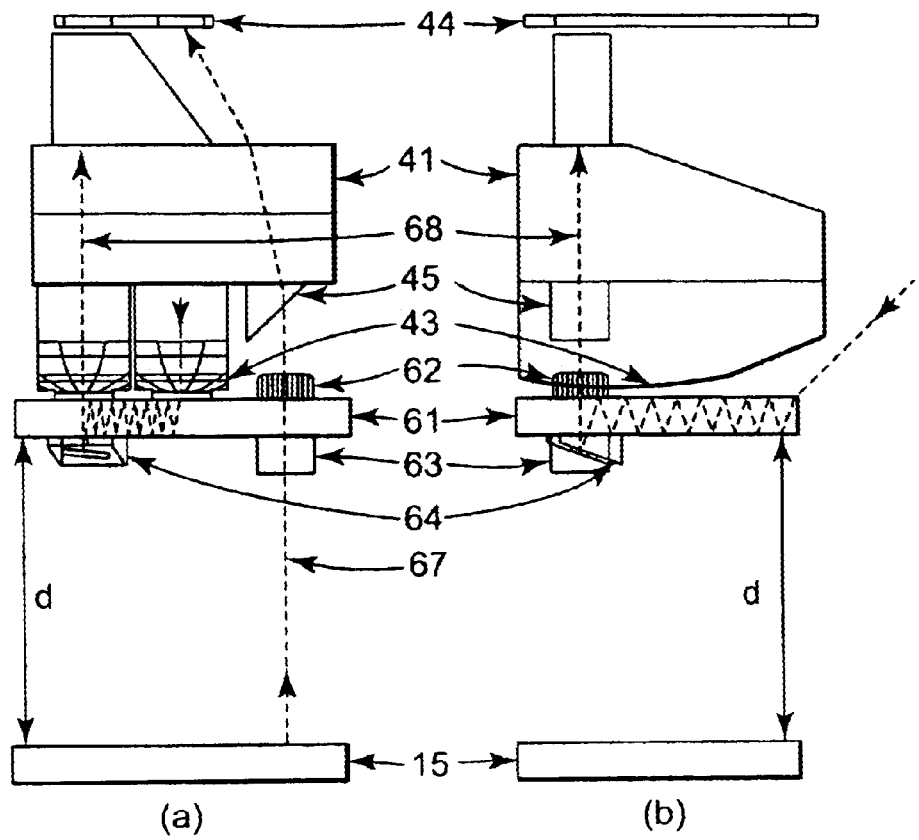
FIG. 10 shows a cross-sectional sketch of a preferred embodiment, in which two parallel spectrometer channels are combined with a distance sensing means. In addition, a base plate containing focusing means for the distance sensing means a guiding means for the reference light is included. This preferred embodiment is used to perform the measurements used in examples 1–3.

FIG. 10 shows another cross-sectional sketch of a preferred embodiment in which a dual channel spectrometer, having an aspheric mirror 43, is combined with a distance sensing means. This embodiment has been used for the examples described below, and includes additionally a base plate 61 that guides part of the reference light 68 to the reference channel. Additionally, the base plate contains the focusing means 62 for the distance sensing means. The base plate 61, spectrometer unit 41, and detecting means 44 are aligned with respect to each other in a specially fabricated box (not shown here).

Figure 11:
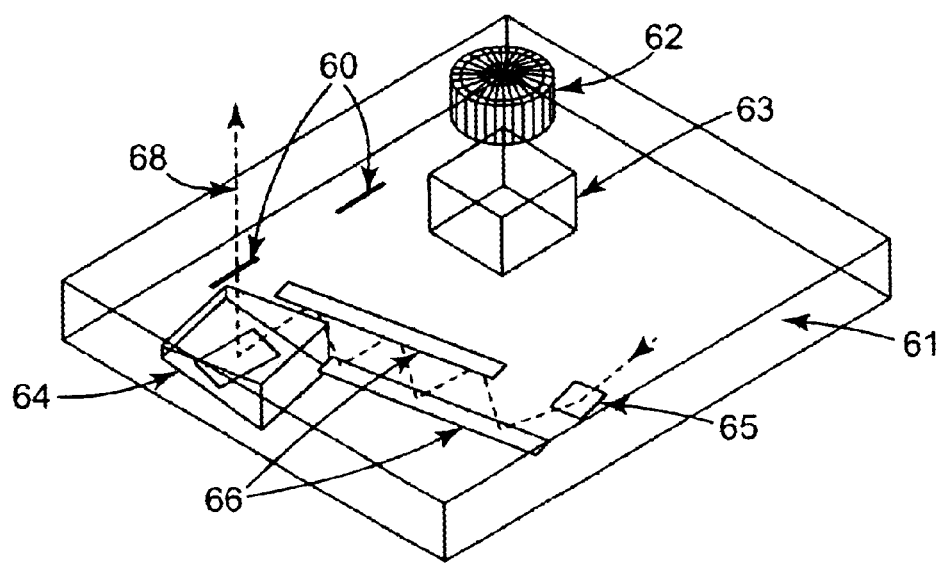
FIG. 11 shows a three dimensional sketch of the base plate used in FIG. 10.

A three dimensional sketch of the base plate 61 is illustrated in FIG. 11. Part of the reference light used to illuminate the object enters the base plate 61 via an entrance aperture 65. A double-sided mirror coating 66 ensures that the light is multiple reflected (see the illustration of the light rays 68 in FIGS. 10 and 11) to a prism with a mirror coating 64. The mirror 64 ensures that the reference light is reflected through the entrance aperture means 60 (here placed on the base plate 61) into the spectrometer reference channel.

Additionally, the base plate 61 contains the focusing means 62 for the distance sensing means. In order not to allow passage of object light through the distance sensing entrance a wavelength bandpass filter 63 allowing only the narrow wavelength bandwidth of the light spot source (not shown here) for the distance sensing means to be transmitted.

A ray trace of the light for the distance sensing means 67 is shown in FIG. 10. For this preferred embodiment, a prism 45 is used to bend the focused light for the distance sensing means to the same detection means 44 as is used to analyze the light from the object. By choosing an array sensor as detection means, the spectrometer can use part of the array sensor as spectral sensing means whereas the distance sensing means use the remaining part of the array sensor as spot detection means.

Figure 12:
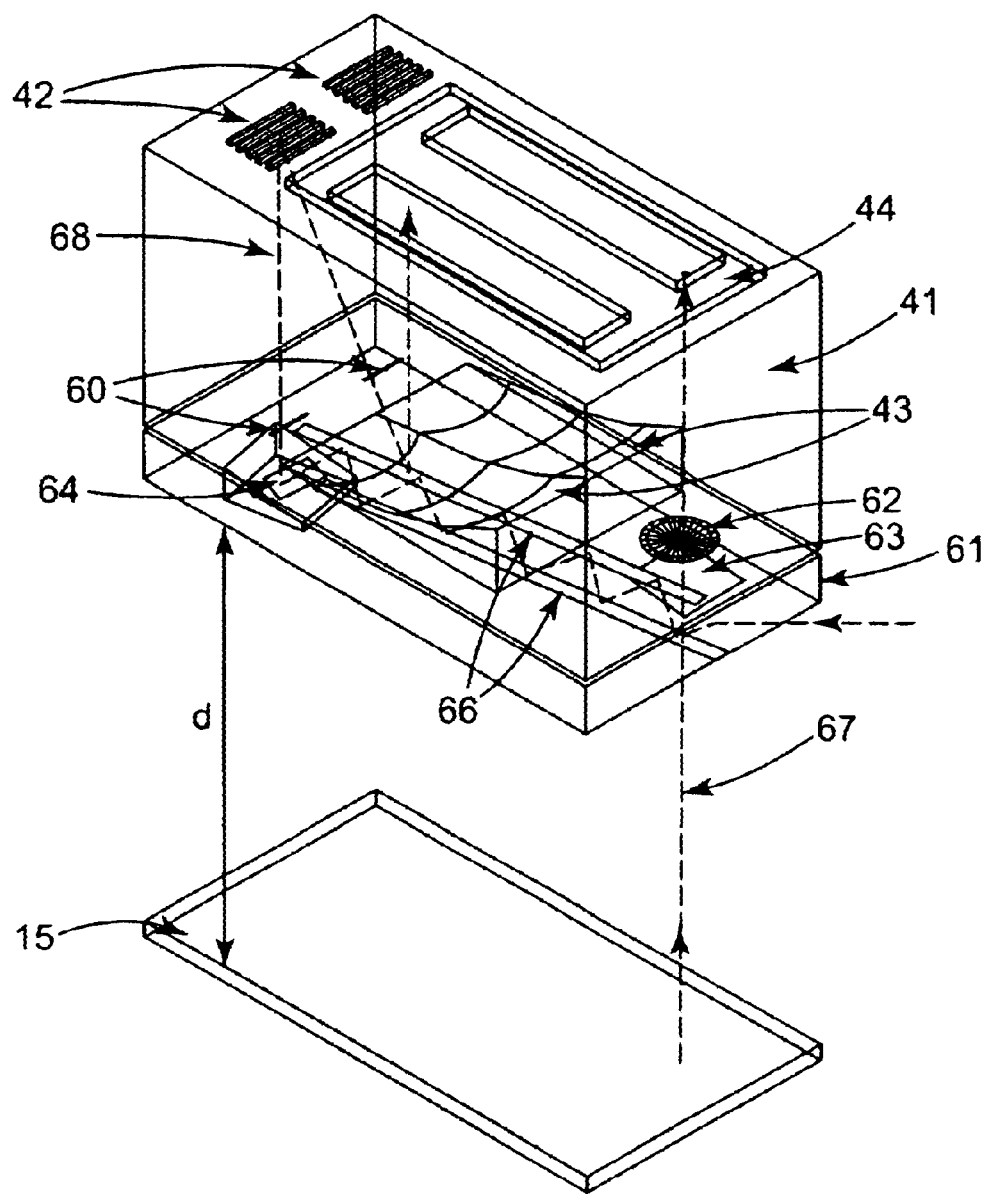
FIG. 12 shows a three dimensional sketch of a preferred embodiment, in which two parallel spectrometer channels are combined with a distance sensing means. In addition, a base plate containing focusing means for the distance sensing means, a guiding means for the reference light is included. In this preferred embodiment, all reflective surfaces are placed below the respective surfaces of the front side and back side of the spectrometer and the base plate.

FIG. 12 shows a three dimensional sketch of another preferred embodiment in which a dual channel spectrometer, having diffractive optical elements 42 and aspheric mirrors 43, is combined with a distance sensing means. This preferred embodiment is a planar version of the embodiment illustrated in FIGS. 10 and 11. In this preferred embodiment, all reflective surfaces are placed below the respective faces of the front side and back side of the spectrometer and the base plate.

EXAMPLES

The invention is further illustrated by the following instructive examples.

Example 1 "Simultaneous Determination of Spectral Distribution from the Object and the Reference Light Source"

Figure 13:
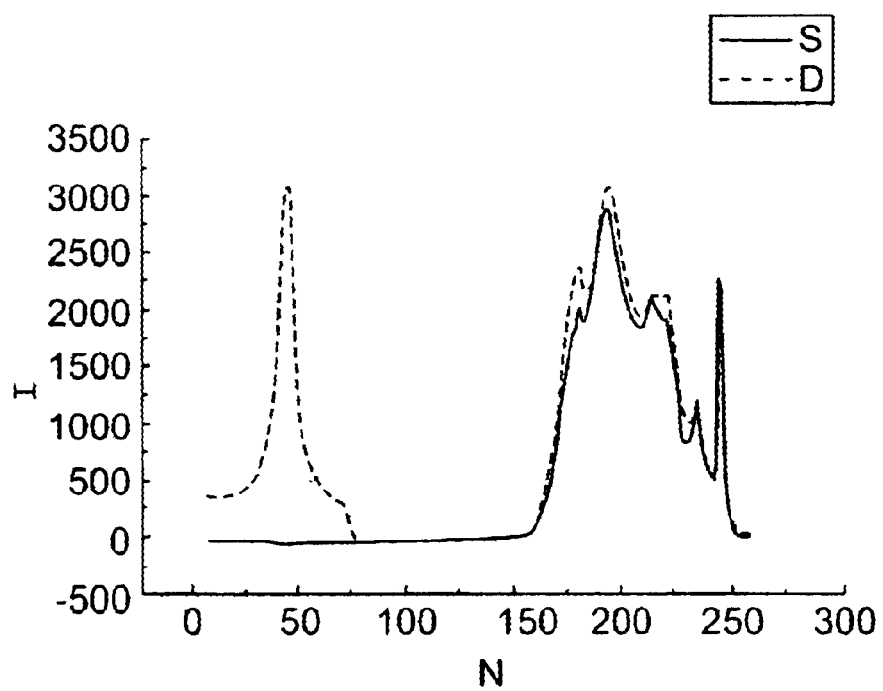
FIG. 13 shows a plot of measured spectral distribution of reference light source in said reference channel and a plot of measured spectral distribution of object and distance-sensing means in said measurement channel.

An apparatus according to the one shown in FIG. 10 was provided where the object was illuminated by a reference light source at an angle of 45 degrees. The object was a calibrated white tile from NPL, UK. The object distance d was 15 mm and the object was illuminated with a xenon light source. The signals are read from the two channels in the array sensor (S4801-256 from Hamamatsu Photonics, JP). FIG. 13 shows the intensity I in arbitrary units versus pixel number N. The solid line S represents the spectral distribution of the reference light source and the dashed line D represents the spectral distribution read from the white object. The pixel numbers are converted to wavelengths by computing means. Note that the spectral distributions only cover pixels 150–256 whereas the remaining pixels (see dashed line D), in particular 0–100, are used by the distance sensing means described in Example 2.

Example 2 "Simultaneous Determination of Spectral Distribution of the Object and Object Distance"

Figure 14:
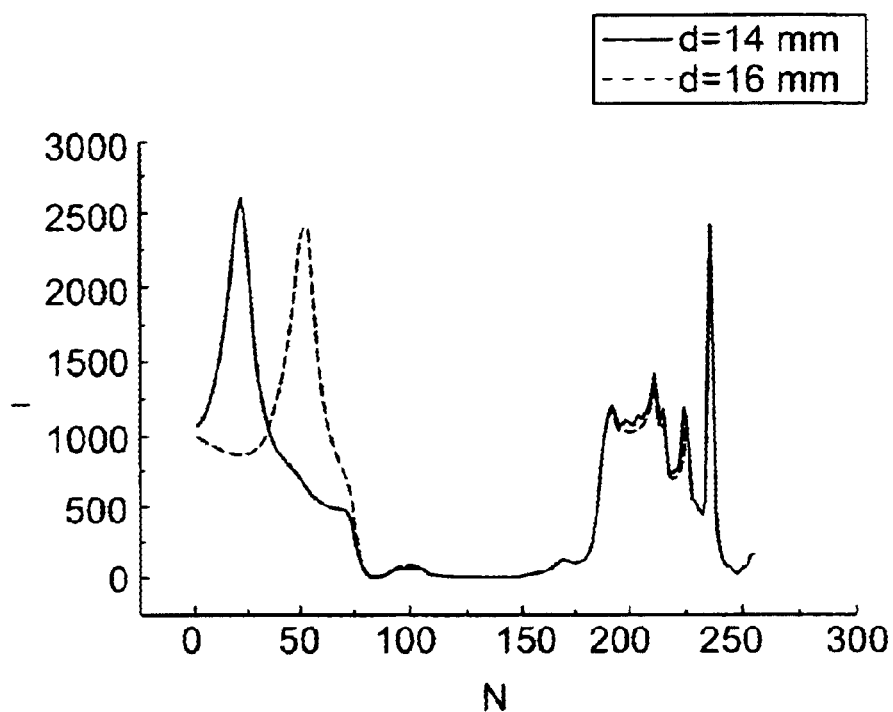
FIG. 14 shows a plot of measured spectral distributions of an orange color calibration tile including distance-sensing means taken at two different object distances.

An apparatus according to the one used in example 1 was provided in which the light spot source (VCSEL SV 4631-001 from Honeywell, US) emitting at 850 nm is focused onto the object under an illumination angle of 40 degrees. A wavelength bandpass filter 63 (JENOFILT 804 CWL-850) was combined with the focusing means 62 on said base plate 61. By illumination of the object via an angle, the triangulation principle is used to determine the object distance. FIG. 14 shows intensity I in arbitrary units versus pixel number N. Measurements are performed at object distances of 14 mm and 16 mm respectively. It is clearly seen that changing the object distance cause displacement of the spot position on said spot detecting means. The spot position is determined by determining the pixel at which the pixel intensity attains its maximum. Converting the spot position to object distance by triangulation is known in the art.

Example 3 "Determination of Object Reflectance Including Correction for Variation in Object Distance"

Figure 15:
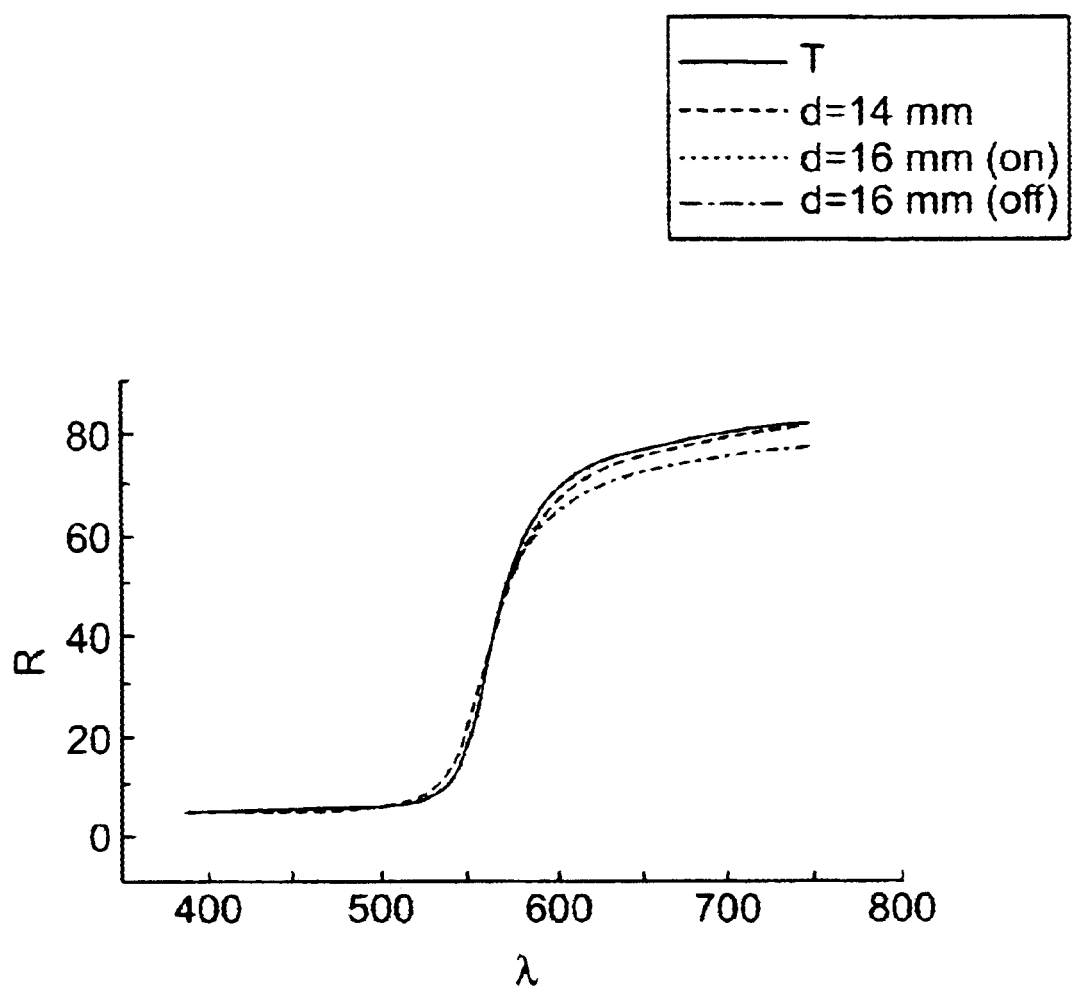
FIG. 15 shows a plot of measured reflectance from an orange color calibration tile, said measured reflection and its dependence on variations in object distance before and after the distance sensing means corrects for variations in object distance. For comparison, the theoretical reflection curve is included too.

Determination of object distance is particularly advantageous in applications where colour has to be measured from solid surfaces, e.g., paper. Varying the object distance changes the total amount of intensity that reaches the detecting means and consequently, the measured colour density vary with varying object distance. By use of the distance sensing means described in example 2, the variation in intensity caused by variations in object distance is corrected. In FIG. 15 showing reflectance R versus wavelength λ [nm], the theoretical reflection curve is shown for a calibrated orange tile from NPL, UK (solid curve). The spectrometer is calibrated at an object distance of 14 mm. From the figure, it can be seen that the measurements performed at d=14 mm (dashed curve) fit the theoretical curve. The object distance is now changed to d=16 mm. Without distance correcting means, it can be seen that the measurements (dashed-dotted curve) do not fit the theoretical curve whereas the measurements agree well with the theory when the distance correcting algorithm is applied (dotted curve). The distance correcting algorithm is applied by computing means.

We claim:

1. An apparatus for measuring spectral information of light from at least one object, comprising:
   a transparent body having a front side and a back side, the front side including
      an entrance surface having at least one entrance aperture for receiving light, and
      at least a first front reflecting surface, and the back side including
         at least a first back reflecting surface for reflecting light received from the at least one entrance aperture to the at least one front reflecting surface, and an exit surface,
   at least one of the at least a first front reflecting surface and the at least a first back reflecting surface including a first diffractive optical element, and at least one of the at least a first front reflecting surface and the at least a first back reflecting surface including a first focusing element, the first diffractive element being arranged to disperse diverging light received from the at least one entrance aperture; and
   a light detector unit arranged to receive the dispersed light through the exit surface from the at least one reflecting surface on the front side.

2. The apparatus according to claim 1, wherein a light path through the transparent body from the entrance aperture to the exit surface via the first diffractive optical element and the first focusing element is incident on an aberration correcting element.

3. The apparatus according to claim 1 wherein the front side further includes at least a second front reflecting surface and the back side includes at least a second back reflecting surface, the at least a second front reflecting surface and the at least a second back reflecting being arranged to reflect light propagating from the entrance aperture to the diffractive optical element.

4. The apparatus according to claim 1, wherein the first diffractive optical element and the light detector unit are arranged in parallel planes.

5. The apparatus according to claim 1, wherein the entrance surface and the exit surface are parallel.

6. The apparatus according to claim 1, wherein the at least one entrance aperture includes a rectangular slit.

7. The apparatus according to claim 1, wherein the at least one entrance aperture includes an exit face of an optical fiber.

8. The apparatus according to claim 1, wherein the first diffractive optical element is aspheric.

9. The apparatus according to claim 1, wherein the light detector unit is positioned at a selected distance from the exit surface of the transparent body.

10. The apparatus according to claim 1, wherein the transparent body is a unitary body.

11. The apparatus according to claim 1, wherein the transparent body is a composite, transparent body.

12. The apparatus according to claim 1, wherein the transparent body is covered by light absorbing material.

13. The apparatus according to claim 1, further comprising at least two spectrometer channel paths between the at least one entrance aperture and the light detector unit.

14. The apparatus according to claim 1 further comprising at least one reference light source to illuminate the at least one object.

15. The apparatus according to claim 1, further comprising an object distance determining unit having a light spot source for illuminating the at least one object and a distance light detector to detect light from the light spot source reflected by the at least one object.

16. The apparatus according to claim 2, wherein the first focusing element is an aspheric focusing element, the aspheric focusing element comprising the aberration correcting element.

17. The apparatus according to claim 2, wherein the aberration correcting element includes one of a tilted exit surface and an aspheric exit surface.

18. The apparatus according to claim 11 wherein the composite, transparent body includes at least first and second body parts, the first body part including the front side and the second body part including the back side.

19. The apparatus according to claim 18, further comprising light absorbing material disposed between the first and second body parts.

20. The apparatus according to claim 19, further comprising at least one intermediate body part between the first and second body parts.

21. The apparatus according to claim 12, wherein the light absorbing material has a refractive index approximately equal to a refractive index of the transparent body.

22. The apparatus according claim 12, wherein the light absorbing material is coated onto the transparent body.

23. The apparatus according to claim 12, wherein the light absorbing material is molded into the transparent body.

24. The apparatus according to claim 13 wherein the at least two spectrometer channel paths are parallel.

25. The apparatus according to claim 14, wherein the at least one reference light source is disposed to illuminate the at least one object in a reflection configuration.

26. The apparatus according to claim 14 wherein the at least one reference light source is disposed to illuminate the at least one object in a transmission configuration.

27. The apparatus according to claim 14, wherein the transparent body includes at least one measuring channel for measuring light from the at least one object and a reference channel for measuring light from the at least one reference light source.

28. The apparatus according to claim 27, further comprising a guiding plate disposed to guide light from the at least one reference light source to the reference channel.

29. The apparatus according to claim 27, further comprising an optical fiber disposed to guide light from the at least one reference light source to the reference channel.

30. The apparatus according to claim 27, further comprising an analyzer coupled to receive measurement and reference signals from the light detector unit, the analyzer being arranged to produce an output measurement signal using the measurement and reference signals, a variation of the output measurement signal with reference light spectrum being less than a variation in the measurement signal with reference light spectrum.

31. The apparatus according to claim 15, wherein the light spot source is a substantially monochromatic light source.

32. The apparatus according to claim 15, wherein the object distance determining unit includes a distance light focusing unit to focus light reflected from the at least one object to the distance light detector.

33. The apparatus according to claim 32, wherein the distance light focusing unit includes a wavelength bandpass filter allowing passage of light only within a bandwidth of the light spot source.

34. The apparatus according to claim 15, wherein the distance light detector detects at least one of position and size of a light beam reflected from the at least one object.

35. The apparatus according to claim 15, wherein the distance light detector is a position sensitive detector or an array detector.

36. The apparatus according to claim 15 wherein the object distance determining unit includes an analyzer coupled to receive a distance measurement signal from the distance light detector and to generate an object distance value representing a distance between the at least one object and the transparent body.

37. The apparatus according to claim 36, wherein the analyzer is further coupled to receive spectrum measurement signals from the light detector unit and to modify the spectrum measurement signals based on the object distance value.

38. An apparatus for measuring spectral information of light from at least one object, comprising:
   a transparent body having a front side and a back side, the front side including
      an entrance surface having at least one input means for inputting light from the at least one object, and
      at least a first front reflecting surface, and the back side including
         at least a first back reflecting surface for reflecting light received from the at least one input means to the at least one front reflecting surface, and
      an exit surface,
   at least one of the at least a first front reflecting surface and the at least a first back reflecting surface including a first diffracting means for diffracting light, and at least one of the at least a first front reflecting surface and the at least a first back reflecting surface including a first focusing means for focusing light, the first diffracting means being arranged to disperse diverging light received from the at least one input means; and
   light detecting means for detecting the dispersed divergent light transmitted out of the exit surface.

39. A method of measuring spectral information of light from an object, comprising:
   inputting signal light from the object to a transparent body through an entrance aperture on a first side of the transparent body;
   propagating divergent signal light from the entrance aperture to a diffractive element on a second side of the transparent body;
   diffracting the divergent signal light with the diffractive element into divergent, separated wavelength components;
   reflectively focusing the divergent, separated wavelength components to an exit face using a focusing reflector on the transparent body; and
   detecting the focused, separated wavelength components using a detector unit.

40. The method as recited in claim 39, further comprising reflecting the divergent signal light from the second side to the first side and back to the second side before the divergent signal light is incident on the diffractive element.

41. The method as recited in claim 39, further comprising:
   illuminating the object with reference light to produce the signal light, and
   reducing spectral influence of the reference light on a spectrum signal generated by the detector unit.

42. The method as recited in claim 39, further comprising illuminating the object with distance light and determining a distance between the object and a distance detector using distance light reflected by the object.

43. The method as recited in claim 42, wherein determining the distance between the object and the distance detector includes determining a light spot size or a light spot position.

44. The method as recited in claim 42, further comprising adjusting a spectrum signal generated by the detector unit in response to the distance determined between the object and the distance detector.

* * * * *